United States Patent
Li

(10) Patent No.: US 8,498,059 B2
(45) Date of Patent: Jul. 30, 2013

(54) VARIABLE POWER ZOOM LENS

(75) Inventor: Dayong Li, Saitama (JP)

(73) Assignee: Tamron Co., Ltd., Saitama (JP)

( * ) Notice: Subject to any disclaimer, the term of this patent is extended or adjusted under 35 U.S.C. 154(b) by 67 days.

(21) Appl. No.: 13/116,256

(22) Filed: May 26, 2011

(65) Prior Publication Data

US 2012/0057234 A1    Mar. 8, 2012

(30) Foreign Application Priority Data

May 28, 2010    (JP) .................. 2010-122985

(51) Int. Cl.
  *G02B 15/14*    (2006.01)
  *G02B 27/64*    (2006.01)
(52) U.S. Cl.
  USPC .......................................... 359/687; 359/557
(58) Field of Classification Search
  USPC ......................................... 359/554–557, 687
  See application file for complete search history.

(56) References Cited

U.S. PATENT DOCUMENTS

| 4,890,904 | A | * | 1/1990 | Ito ................................. 359/680 |
| 5,579,171 | A | * | 11/1996 | Suzuki et al. ................. 359/687 |
| 7,253,965 | B2 | * | 8/2007 | Shibayama et al. .......... 359/687 |
| 7,315,424 | B2 | * | 1/2008 | Saruwatari .................... 359/687 |
| 7,532,412 | B2 | | 5/2009 | Hatada |
| 2009/0296230 | A1 | * | 12/2009 | Sakai ............................. 359/684 |

FOREIGN PATENT DOCUMENTS

| JP | 2008-216440 | 9/2008 |
| JP | 2009-037252 | 2/2009 |

* cited by examiner

*Primary Examiner* — Scott J Sugarman
(74) *Attorney, Agent, or Firm* — Jacobson Holman PLLC

(57) ABSTRACT

The present invention is a variable power zoom lens that is suitable to APS-format single-lens reflex cameras. The zoom lens has the foremost or first lens group G1 of positive refractivity, the second lens group G2 of negative refractivity, the third lens group G3 of positive refractivity, and the fourth lens group G4 of positive refractivity disposed in sequence from a position closer to the object to photograph toward the image plane. The third lens group G3 has a front lens subset G3F of positive refractivity and a back lens subset G3B, and the back lens subset G3B alone is moved orthogonal to the optical axis to correct a blur of an image on the image plane caused by a shake of photographer's hands.

9 Claims, 10 Drawing Sheets

COMATIC ABERRATION

SPHERICAL ABERRATION    ASTIGMATISM    DISTORTION ABERRATION    CHROMATIC ABERRATION OF MAGNIFICATION

COMATIC ABERRATION

SPHERICAL ABERRATION ASTIGMATISM DISTORTION ABERRATION CHROMATIC ABERRATION OF MAGNIFICATION

COMATIC ABERRATION

SPHERICAL ABERRATION | ASTIGMATISM | DISTORTION ABERRATION | CHROMATIC ABERRATION OF MAGNIFICATION

COMATIC ABERRATION

SPHERICAL ABERRATION | ASTIGMATISM | DISTORTION ABERRATION | CHROMATIC ABERRATION OF MAGNIFICATION

COMATIC ABERRATION

VARIABLE POWER ZOOM LENS

FIELD OF THE INVENTION

The present invention relates to a variable power zoom lens, and more particularly, to an enhanced variable power zoom lens that has a zoom ratio of 15× or even higher and an angle of view of 75 degrees or even wider at the wide-angle end, and that is suitable to compact APS-format single-lens reflex cameras.

BACKGROUND ART

Some prior art variable power zoom lenses include an APS-format compatible anti-shake zoom lens that has the foremost or first lens group of positive refractivity, the second lens group of negative refractivity, the third lens group of positive refractivity, and the fourth lens group of positive refractivity disposed in sequence from a position closer to the object to photograph where each pair of the lens groups come closer to or space farther apart from each other for varying the magnification power during zooming.

In such a zoom lens, the third lens group consists of a front subset of lens pieces of positive refractivity and a rear subset of lens pieces of negative refractivity disposed in sequence from a position closer to the object. The rear subset alone is moved in a direction perpendicular to the optical axis to correct an imaging position, and at least one of surfaces of the lens pieces in the rear subset is made aspherical in shape so that positive refractive power is enhanced or negative refractive power is diminished as it goes from the optical axis toward the periphery of the lens piece, in comparison with a spherical surface having paraxial radius of curvature.

In addition, such a zoom lens meets requirements as expressed in the following formulae:

$$3.7 < f1/fw < 7.0$$

where f1 is a focal length of the first lens group, and fw is the focal length of the zoom lens at the wide-angle end. (See Patent Document 1 listed below.)

Some other prior art variable power zoom lenses include an APS-format compatible zoom lens that has the foremost or first lens group of positive refractivity, the second lens group of negative refractivity, and succeeding lens groups with the one of positive refractivity disposed in sequence from a position closer to the object to photograph where the succeeding lens groups include a lens group IS of negative refractivity moved in a direction induced by orthogonal coordinate components to the optical axis in the Cartesian coordinate system so as to shift an imaging position, and a lens group R_IS of positive refractivity positioned behind the lens group IS and closer to the image plane. For zooming, the lens group IS and the lens group R_IS come closer to or space farther apart from each other, and the zoom lens meets requirements as defined in the following formulae:

$$0.05 < |fIS/fT| < 0.18$$

$$2.0 < f1/fR\_IS < 4.5$$

where fIS is a focal length of the lens group IS, fR_IS is the focal length of the lens group R_IS, and fT is the focal length of the whole optics of the zoom lens at the telephoto end. (See Patent Document 2 listed below.)

LIST OF CITED DOCUMENTS

Patent Documents

Patent Document 1—Japanese Official Gazette of Preliminary Publication of Unexamined Patent Application No. 2009-037252; and Patent Document 2—Japanese Official Gazette of Preliminary Publication of Unexamined Patent Application No. 2008-216440.

The variable power zoom lens disclosed in Patent Document 1 is the one which has an anti-shake function and has a long back focal suitable to digital single-lens reflex cameras. However, the enhanced variable power zoom lens in the cited document is 18 to 200 mm in focal length and 11.11× in varied magnification ratio for zooming.

The variable power zoom lens disclosed in Patent Document 2 is the one which has an anti-shake function and has a long back focal suitable to the digital single-lens reflex cameras. However, an embodiment of the zoom lens in the cited document has a focal length ranging from 18 to 200 mm and is 11.11× in varied magnification power for zooming.

Assuming now that the variable power zoom lenses disclosed in Patent Document 1 and Patent Document 2 have their respective varied magnification power of 15× for zooming, a distance between the first and second lens groups should be excessively great at the telephoto end to such an extent of an unrealistic condition that a convex lens piece of the first lens group is to be thinner than zero thickness in its peripheral portion. Even if such zoom lenses are modified in a realistic design where the convex lens piece of the first lens group ensures a thickness in its peripheral portion as can be practically fabricated, the resultant first lens group must have a greater effective aperture, which leads to a failure to downsize the zoom lens.

The present invention is made to overcome the aforementioned disadvantages of the prior art enhanced variable power zoom lenses, and accordingly, it is an object of the present invention to provide the improved variable power zoom lens that is downsized, still attaining a zoom ratio of 15× or even higher and an angle of view of 75 degrees or even wider, and that is suitable to APS-format single-lens reflex cameras.

SUMMARY OF THE INVENTION

The present invention provides a variable power zoom lens that has the foremost or first lens group G1 of positive refractivity, the second lens group G2 of negative refractivity, the third lens group G3 of positive refractivity, and the fourth lens group G4 of positive refractivity disposed in sequence from a position closer to the object to photograph toward the image plane. The third lens group G3 has a front lens subset G3F of positive refractivity and a back lens subset G3B, and the back lens subset G3B alone is moved orthogonal to the optical axis to correct a blur of an image on the image plane caused by a shake of photographer's hands. The zoom lens is adapted to meet requirements as defined in conditional formulae (1) as follows:

$$12 < Lt/(Ft/Fw) < 15 \quad (1)$$

where Lt is the entire length of the lens optics (i.e., from the front surface of the foremost lens piece to the image plane) at the telephoto end, Ft is a focal length of the lens optics in whole at the telephoto end, and Fw is the focal length of the lens optics in whole at the wide-angle end.

Configured in a manner as mentioned above, the variable power zoom lens of the present invention is downsized, still attaining a zoom ratio of 15× or even higher and an angle of view of 75 degrees or even wider at the wide-angle end, and is suitable to APS-format single-lens reflex cameras.

The present invention will be outlined in conjunction with several aspects thereof below.

In one aspect of the present invention as in claim 2, the zoom lens further meets requirements as defined in conditional formulae (2) as follows:

$$-1.5 < F1/F\_Bt < -0.5 \qquad (2)$$

where F1 is a focal length of the first lens group G1, and F_Bt is the focal length from the front surface of the foremost lens piece in the second lens group G2 to the image plane at the telephoto end.

In a second aspect of the present invention as in claim 3, the zoom lens meets requirements as defined in conditional formulae (3) as follows:

$$-3.5 < \beta t < -1.55 \qquad (3)$$

where βt is a lateral magnification of an anti-shake lens group at the telephoto end.

In a third aspect of the present invention as in claim 4, the third lens group consists of a front lens subset of lens pieces of positive refractivity and a rear lens subset of lens pieces of negative refractivity, and the rear lens subset is dedicated to correction of a blur of an image.

In a fourth aspect of the present invention as in claim 5, the fourth lens group consists of a series of lens pieces respectively having positive, negative, and, positive refractive powers.

In a fifth aspect of the present invention as in claim 6, the second lens group shows two deflection points throughout a single stroke of the second lens group during shifting from the wide-angle end to the telephoto end to vary magnification power.

<Description of the Formulae and Terminology>

When Lt/(Ft/Fw) is exceedingly lower than the lower limit as defined in the formulae (1), the lens optics in whole can be reduced in lengthwise dimension in an expanded posture at the telephoto end but has power of its component lens groups raised excessively, which leads to difficulty in compensating for aberration. When Lt/(Ft/Fw) is exceedingly higher than the upper limit as defined in the formulae (1), the lens optics is capable of facilitating compensation for aberration but instead fails to achieve downsizing.

When F1/F_Bt is exceedingly lower than the lower limit as defined in the formulae (2), the lens optics is successfully reduced in lengthwise dimension in an expanded posture at the telephoto end but experiences difficulty in compensating for aberration. When F1/F_Bt is exceedingly higher than the upper limit as defined in the formulae (2), the lens optics is capable of facilitating compensation for aberration, but instead, necessitates an increased displacement by the first lens group; that is, increase in the lengthwise dimension of the whole optics in the expanded posture at the telephoto end leads to unavoidable enlargement of a lens barrel instead of downsizing the zoom lens.

In this specification, the phrase 'deflection point(s) throughout a single stroke of the (second) lens group during shifting from the wide-angle end to the telephoto end to vary magnification power' designates a point(s) in which an tangential line to a graph representing the stroke of the lens group turns its inclination direction from upward to right to downward to right or from downward to right to upward to right in the Cartesian coordinate system with the vertical axis indicative of the focal length and the horizontal axis indicative of the position of the (second) lens group along the optical axis. In the present invention, without such a deflection point during shifting to the wide-angle end, the lens optics experiences difficulty in compensating for curvature of field. Without the deflection point during shifting to the telephoto end, incident rays for the full (100%) image height are prone to have a lower half cut off, and in order to avoid this, the first lens group must be increased in effective aperture, which necessitates a trade-off with abandoning an attempt to downsize the zoom lens.

BRIEF DESCRIPTION OF THE DRAWINGS

FIG. 6 depicts graphs of comatic aberration of the first embodiment of the zoom lens in infinity focus at the telephoto end for zooming in;

FIG. 7 depicts graphs of various types of aberration, such as spherical aberration, astigmatism, distortion aberration, and chromatic aberration of magnification, in the first embodiment of the zoom lens in infinity focus at the telephoto end for zooming in;

FIG. 13 depicts graphs of comatic aberration of the second embodiment of the zoom lens in infinity focus at the telephoto end for zooming in and FIG. 14 depicts graphs of various types of aberration, such as spherical aberration, astigmatism, distortion aberration, and chromatic aberration of magnification, in the second embodiment of the zoom lens in infinity focus at the telephoto end for zooming in.

BEST MODE OF THE INVENTION

The present invention will now be detailed in conjunction with various embodiments, referring to the accompanying drawings.

An equation representing an aspherical surface in each of the embodiment is given as follows:

$$z = \frac{y^2}{R(1+\sqrt{1-(1+K)y^2/R^2})} + Ay^2 + By^4 + Cy^6 + Dy^8 + Ey^{10} + Fy^{12} \quad (3)$$

where z is a depth of an aspherical surface, y is a height, R is a paraxial radius of curvature, and K, A, B, C, D, E and F are coefficients of aspherical surfaces.

Embodiment 1

Figure 1:
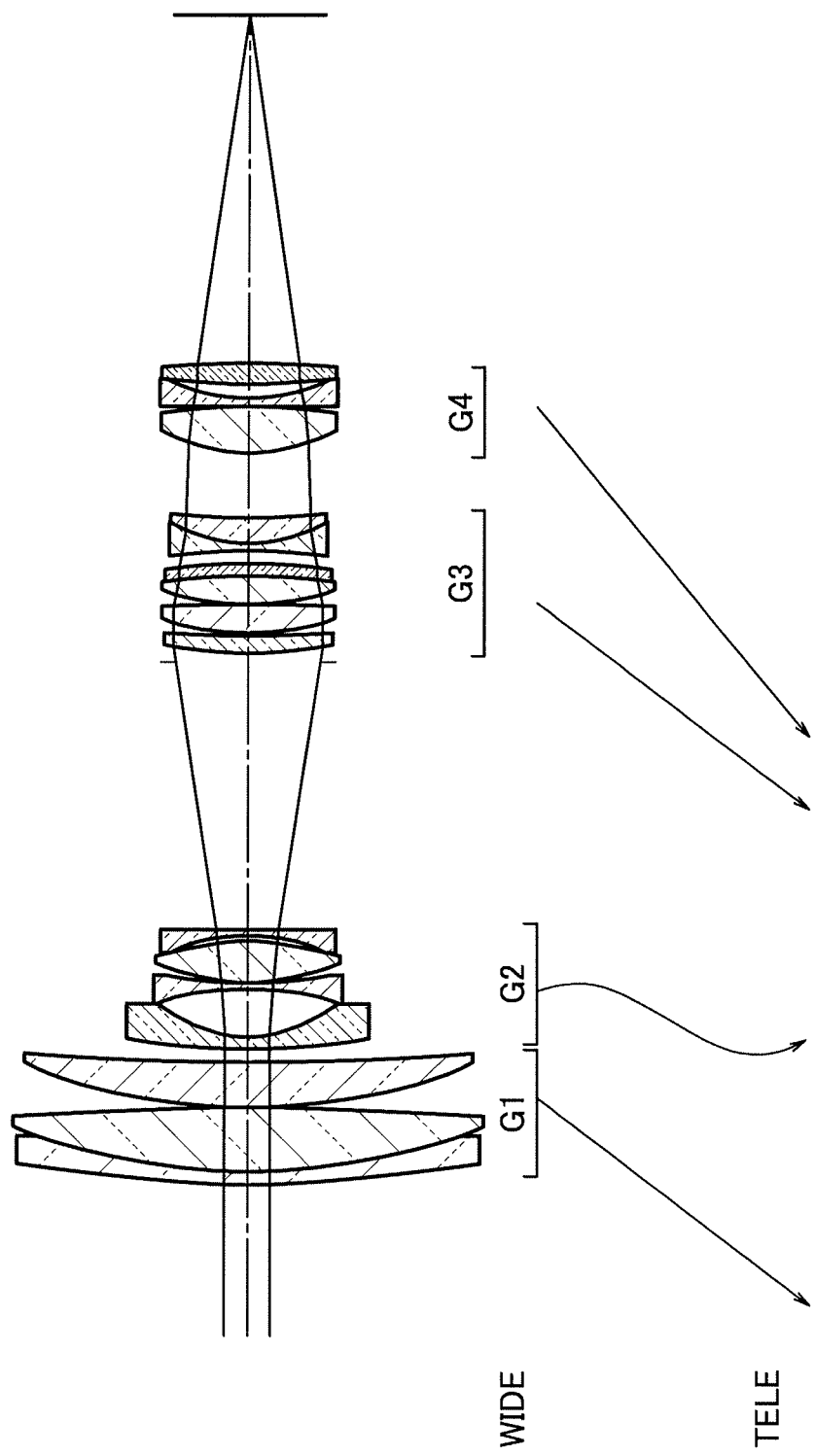
FIG. 1 is a cross-sectional view of a first embodiment of a zoom lens of the present invention, showing a stroke of lens groups.

The first embodiment of the enhanced variable power zoom lens has, as shown in FIG. 1, the foremost or first lens group G1 of positive refractivity, the second lens group G2 of negative refractivity, the third lens group G3 of positive refractivity, and the fourth lens group G4 of positive refractivity disposed in sequence from a position closer to the object to photograph.

The zoom lens in the first embodiment is characterized by numerical data as follows:

|  | Wide-angle | Intermediate | Telephoto |
| --- | --- | --- | --- |
| Focal Length | 18.5 | 71.0 | 291.2015 |
| Field Angle 2ω (°) | 79.46 | 22.47 | 5.57 |
| FNo. | 3.44 | 6.03 | 6.50 |

| NS | R | D | Nd | ABV |
| --- | --- | --- | --- | --- |
| 1 | 141.1468 | 1.5000 | 1.90366 | 31.31 |
| 2 | 69.3714 | 7.1000 | 1.49700 | 81.61 |
| 3 | −332.6134 | 0.1500 |  |  |
| 4 | 63.9453 | 5.1000 | 1.61800 | 63.39 |
| 5 | 328.3371 | D(5) |  |  |
| 6 ASPH | 120.1024 | 0.2000 | 1.51460 | 49.96 |
| 7 | 102.4853 | 1.0000 | 1.88300 | 40.80 |
| 8 | 15.1238 | 5.3047 |  |  |
| 9 | −39.8665 | 0.8000 | 1.77250 | 49.62 |
| 10 | 39.8665 | 0.1500 |  |  |
| 11 | 27.9302 | 4.6000 | 1.84666 | 23.78 |
| 12 | −32.1001 | 0.6619 |  |  |
| 13 | −22.8444 | 0.8000 | 1.83481 | 42.72 |
| 14 | −314.1081 | D(14) |  |  |
| 15 STOP | INF | 1.0000 |  |  |
| 16 | 43.5895 | 2.1000 | 1.72916 | 54.67 |
| 17 | 198.3247 | 0.1500 |  |  |
| 18 | 31.5974 | 3.3000 | 1.49700 | 81.61 |
| 19 | −85.9757 | 0.1500 |  |  |
| 20 | 32.4055 | 3.6000 | 1.48749 | 70.44 |
| 21 | −32.4055 | 0.8000 | 1.92286 | 20.88 |
| 22 | −79.7693 | 1.5829 |  |  |
| 23 ASPH | −45.2054 | 0.9000 | 1.85135 | 40.10 |
| 24 | 17.0548 | 2.8885 | 1.80809 | 22.76 |
| 25 | 63.8056 | D(25) |  |  |
| 26 ASPH | 19.1560 | 5.2913 | 1.59201 | 67.02 |
| 27 ASPH | −38.5354 | 0.1500 |  |  |
| 28 | −487.7854 | 0.8000 | 1.90366 | 31.31 |
| 29 | 20.0365 | 1.5195 |  |  |
| 30 | 71.1245 | 2.5000 | 1.69895 | 30.05 |
| 31 | −71.1245 | D(31) |  |  |

NS—Number of Lens Surface;
R—Radius of Curvature (in Millimeters or mm) of the Lens Surface;
D—Thickness or Distance (in Millimeters or mm);
Nd—Refractive Power at the d-line; and
ABV is Abbe Dispersion Value.

The coefficients of various aspherical surfaces are given in 7-value series of K, 2(A), 4(B), 6(C), 8(D), 10(E), and 12(F):

Surface #6

0.0000 0.00000e+000 1.00848e−005 −8.23992e−008 7.73802e−010 −3.65697e−012 7.40459e−015

Surface #23

0.0000 0.00000e+000 1.20221e−005 −1.69654e−008 3.67494e−010 −2.56282e−012 0.00000e+000

Surface #26

0.0000 0.00000e+000 −2.13290e−005 1.07151e−007 −1.36111e−009 1.05249e−011 0.00000e+000

Surface #27

−8.6353 0.00000e+000 9.38555e−006 7.17720e−008 −8.25848e−010 8.21363e−012 0.00000e+000

A varied distance D(Surface#) between any pair of the adjacent lens groups during zooming operation is given as follows:

| Focal Length | 18.5000 | 71.000 | 291.2015 |
| --- | --- | --- | --- |
| D(5) | 1.6998 | 30.1741 | 66.5707 |
| D(14) | 30.7371 | 12.6774 | 1.5000 |
| D(25) | 7.4142 | 2.1598 | 0.9000 |
| D(31) | 39.0550 | 82.0274 | 91.8692 |

In the first embodiment, Lt/(Ft/Fw)=13.66 in terms of the formula (1). F1/FBt_Bt=−1.06 in terms of the formula (2). Moreover, in terms of the formula (3), βt=−2.24.

A displacement of each of the lens groups during zooming in the first embodiment of the present invention is given as follows: + denotes the displacement toward the object to photograph while − denotes the displacement toward the image plane.

| Focal Length | 1st Lens Group | 2nd Lens Group | 3rd Lens Group | 4th Lens Group |
| --- | --- | --- | --- | --- |
| 18.500 | 0.000 | 0.000 | 0.000 | 0.000 |
| 21.477 | 0.934 | −0.366 | 3.371 | 4.485 |
| 36.181 | 17.931 | 3.842 | 15.287 | 18.551 |
| 71.000 | 48.159 | 19.685 | 37.745 | 42.999 |
| 140.001 | 71.413 | 19.746 | 41.691 | 47.524 |
| 291.202 | 81.994 | 17.123 | 46.360 | 52.874 |

Figure 2:
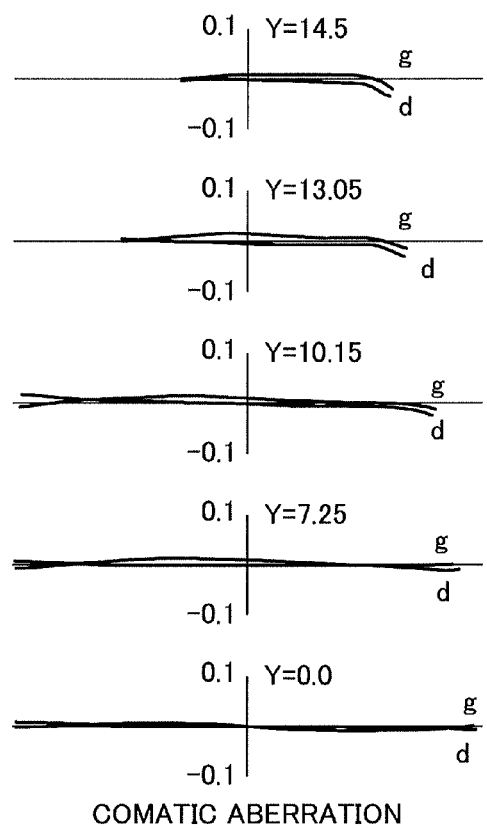
FIG. 2 depicts graphs of comatic aberration in the first embodiment of the zoom lens in infinity focus at the wide-angle end for zooming out.

Comatic aberration in the first embodiment of the zoom lens in infinity focus at the wide-angle end for zooming out is illustrated in graphs of FIG. 2.

Figure 3:
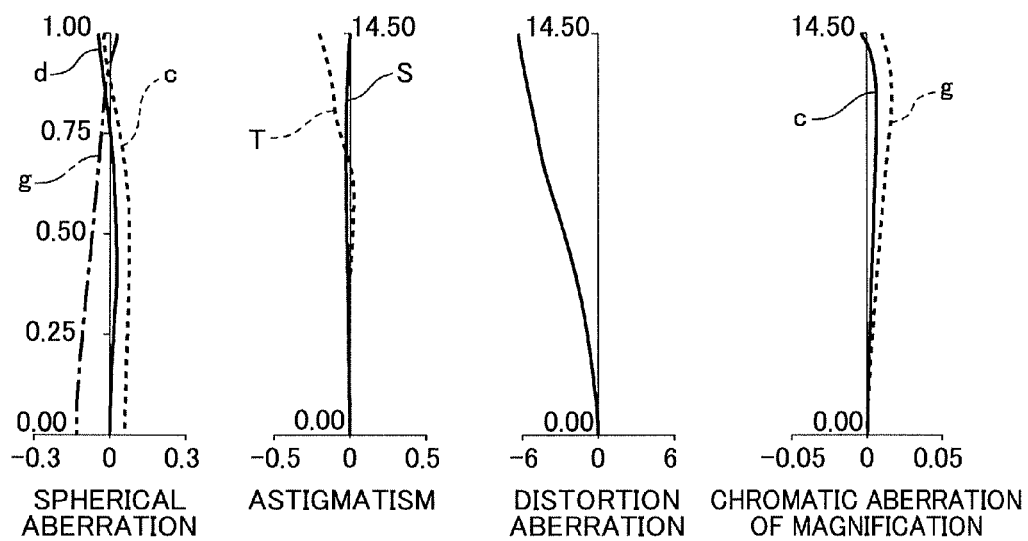
FIG. 3 depicts graphs of various types of aberration, such as spherical aberration, astigmatism, distortion aberration, and chromatic aberration of magnification, in the first embodiment of the zoom lens in infinity focus at the wide-angle end for zooming out.

Other various types of aberration, such as spherical aberration, astigmatism, distortion aberration, and chromatic aberration of magnification, in the first embodiment of the zoom lens in infinity focus at the wide-angle end for zooming out are illustrated in graphs of FIG. 3.

Figure 4:
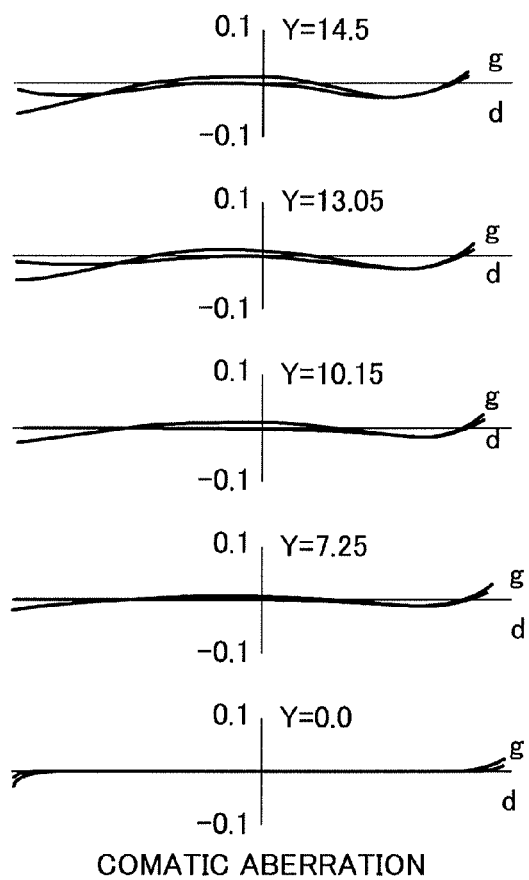
FIG. 4 depicts graphs of comatic aberration of the first embodiment of the zoom lens in infinity focus at the intermediate zooming range.

The comatic aberration of the first embodiment of the zoom lens in infinity focus at the intermediate zooming range is illustrated in graphs of FIG. 4.

Figure 5:
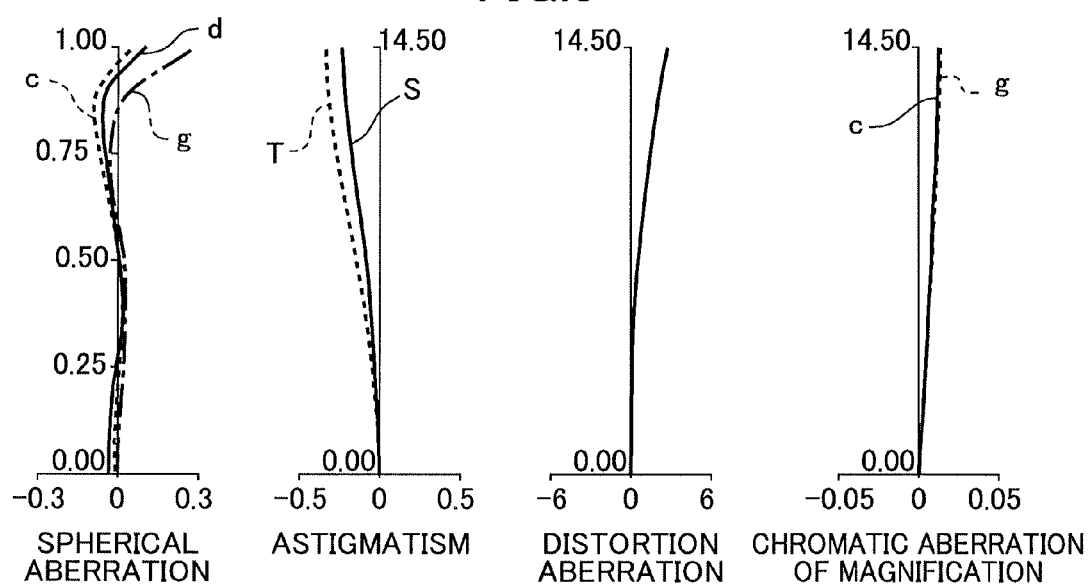
FIG. 5 depicts graphs of various types of aberration, such as spherical aberration, astigmatism, distortion aberration, and chromatic aberration of magnification, in the first embodiment of the zoom lens in infinity focus at the intermediate zooming range.

The remaining various types of aberration, such as spherical aberration, astigmatism, distortion aberration, and chromatic aberration of magnification, in the first embodiment of the zoom lens in infinity focus at the intermediate zooming range are illustrated in graphs of FIG. 5.

Figure 6:
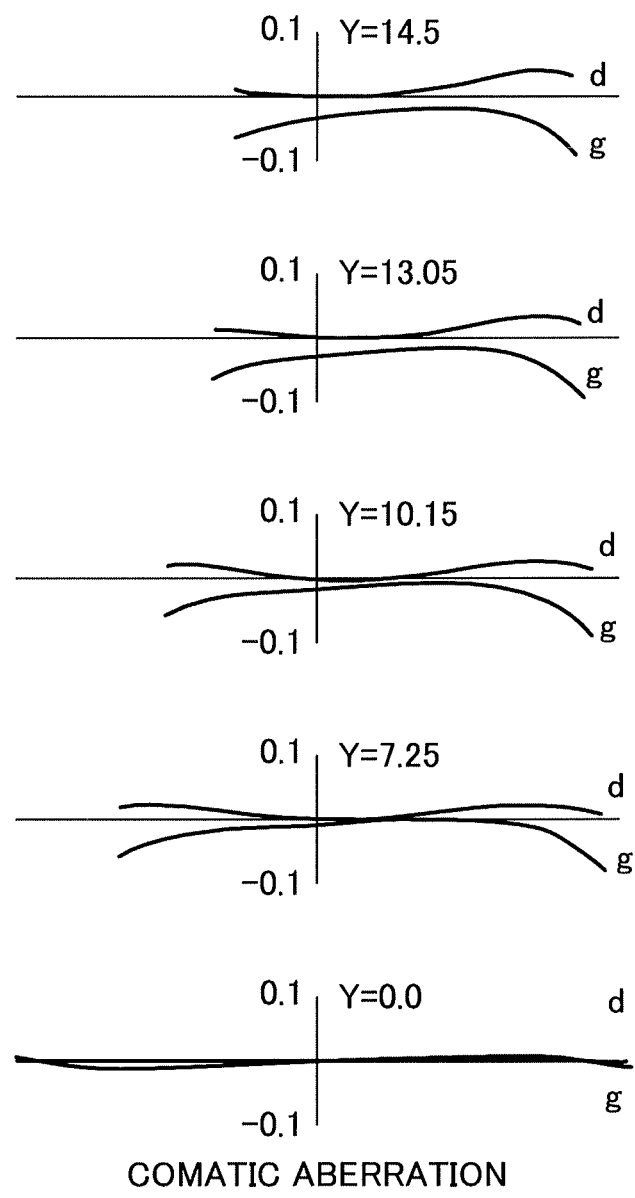

The comatic aberration of the first embodiment of the zoom lens in infinity focus at the telephoto end for zooming in is illustrated in graphs of FIG. 6.

Figure 7:
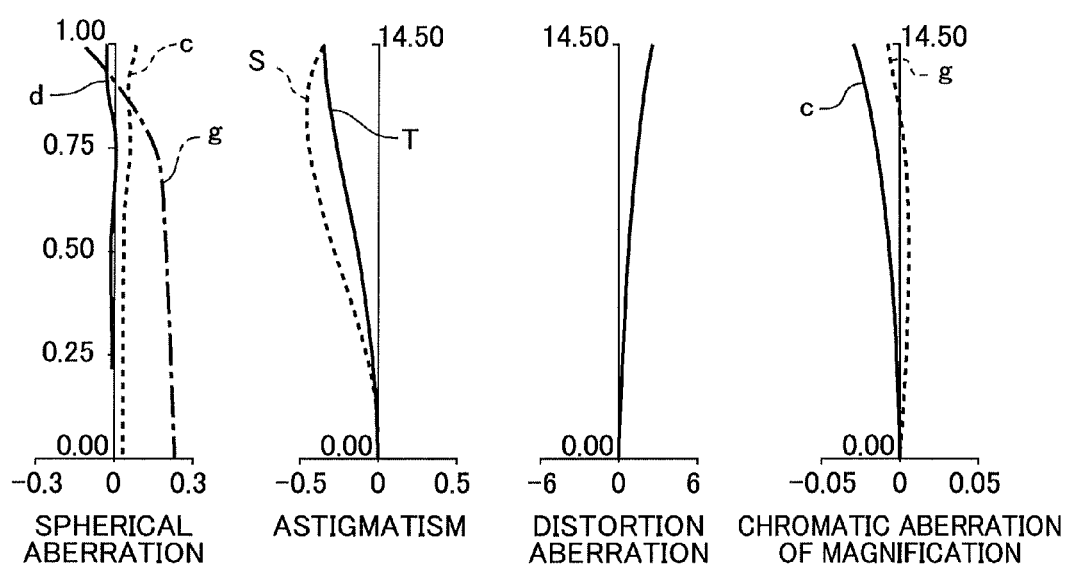

The remaining various types of aberration, such as spherical aberration, astigmatism, distortion aberration, and chromatic aberration of magnification, in the first embodiment of the zoom lens in infinity focus at the telephoto end for zooming in are illustrated in graphs of FIG. 7.

Embodiment 2

Figure 8:
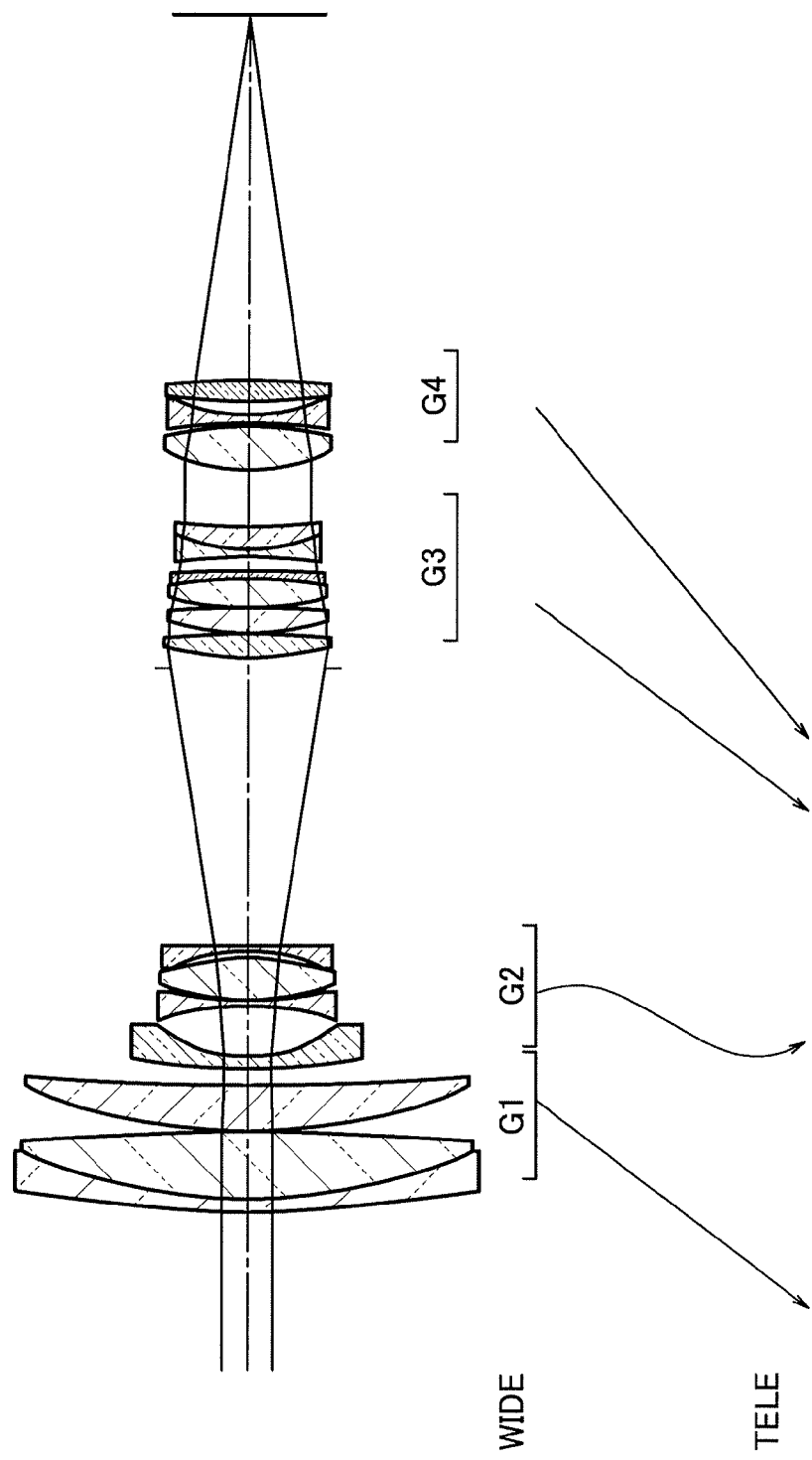
FIG. 8 is a cross-sectional view of a second embodiment of a zoom lens of the present invention, showing a stroke of each of lens groups.

A second embodiment of the enhanced variable power zoom lens has, as shown in FIG. 8, the foremost or first lens group G1 of positive refractivity, the second lens group G2 of negative refractivity, the third lens group G3 of positive refractivity, and the fourth lens group G4 of positive refractivity disposed in sequence from a position closer to the object to photograph.

The zoom lens in the second embodiment is characterized by numerical data as follows:

|  | Wide-angle | Intermediate | Telephoto |
|---|---|---|---|
| Focal Length | 18.5 | 71.0 | 272.113 |
| Field Angle 2ω (°) | 79.50 | 22.13 | 5.55 |
| FNo. | 3.47 | 5.96 | 6.48 |

| NS | R | D | Nd | ABV |
|---|---|---|---|---|
| 1 | 130.7431 | 1.5000 | 1.90366 | 31.31 |
| 2 | 65.7034 | 7.1000 | 1.49700 | 81.61 |
| 3 | −339.9461 | 0.1500 | | |
| 4 | 62.6704 | 5.0000 | 1.61800 | 63.39 |
| 5 | 361.5179 | D(5) | | |
| 6 ASPH | 93.3887 | 0.2000 | 1.51460 | 49.96 |
| 7 | 86.4164 | 1.0000 | 1.88300 | 40.80 |
| 8 | 14.4958 | 5.3752 | | |
| 9 | −31.8736 | 0.8000 | 1.78800 | 47.49 |
| 10 | 47.5561 | 0.1500 | | |
| 11 | 29.8738 | 4.3324 | 1.84666 | 23.78 |
| 12 | −29.8738 | 0.6384 | | |
| 13 | −21.5679 | 0.8000 | 1.80420 | 46.50 |
| 14 | −209.8545 | D(14) | | |
| 15 STOP | INF | 1.0000 | | |
| 16 | 30.9383 | 2.6870 | 1.61800 | 63.39 |
| 17 | −127.6458 | 0.1500 | | |
| 18 | 30.0000 | 2.7661 | 1.48749 | 70.44 |
| 19 | −130.9343 | 0.1500 | | |
| 20 | 38.8497 | 3.0000 | 1.48749 | 70.44 |
| 21 | −38.8497 | 0.8000 | 1.92286 | 20.88 |
| 22 | −182.1340 | 1.6853 | | |
| 23 ASPH | −33.5311 | 0.8000 | 1.85135 | 40.10 |
| 24 | 18.0734 | 2.4899 | 1.80809 | 22.76 |
| 25 | 69.9505 | D(25) | | |
| 26 ASPH | 21.5703 | 4.7476 | 1.59201 | 67.02 |
| 27 ASPH | −26.6100 | 0.1500 | | |
| 28 | −61.4959 | 1.2090 | 1.91082 | 35.25 |
| 29 | 22.7924 | 1.1509 | | |
| 30 | 63.0000 | 2.5000 | 1.64769 | 33.84 |
| 31 | −43.1220 | D(31) | | |

The coefficients of various aspherical surfaces are given in 7-value series of K, 2(A), 4(B), 6(C), 8(D), 10(E), and 12(F):

Surface #6

0.0000 0.00000e+000 9.05924e−006 −7.86241e−008 7.31156e−010 −3.80354e−012 8.88055e−015

Surface #23

0.0000 0.00000e+000 1.91386e−005 6.41280e−010 −6.69098e−011 1.80404e−013 0.00000e+000

Surface #26

0.0000 0.00000e+000 −2.36387e−005 1.59870e−007 −2.09526e−009 1.05786e−011 0.00000e+000

Surface #27

−10.2140 0.00000e+000 −3.03782e−005 4.08305e−007 −3.46238e−009 1.42933e−011 0.00000e+000

A varied distance D(Surface#) between any pair of the adjacent lens groups during zooming operation is given as follows:

| Focal Length | 18.50 | 71.0 | 272.113 |
|---|---|---|---|
| D(5) | 1.6189 | 29.0943 | 62.5000 |
| D(14) | 29.8067 | 12.7906 | 2.5000 |
| D(25) | 6.0175 | 1.7499 | 1.0675 |
| D(31) | 38.9985 | 81.5645 | 90.1412 |

In the second embodiment, $Lt/(Ft/Fw)=14.21$ in terms of the formula (1). $F1/F\_Bt=-0.91$ in terms of the formula (2). Moreover, in terms of the formula (3), $\beta t=-2.58$.

A displacement of each of the lens groups during zooming in the second embodiment of the present invention is given as follows: + denotes the displacement toward the object to photograph while − denotes the displacement toward the image plane.

| Focal Length | 1st Lens Group | 2nd Lens Group | 3rd Lens Group | 4th Lens Group |
|---|---|---|---|---|
| 18.500 | 0.000 | 0.000 | 0.000 | 0.000 |
| 18.500 | 0.000 | 0.000 | 0.000 | 0.000 |
| 20.792 | 1.703 | −0.178 | 2.329 | 3.046 |
| 30.000 | 14.592 | 1.211 | 8.591 | 10.360 |
| 71.000 | 48.761 | 21.285 | 38.301 | 42.569 |
| 150.000 | 71.788 | 20.766 | 42.134 | 46.759 |
| 272.113 | 79.770 | 18.888 | 46.195 | 51.145 |

A stroke of each of lens groups in a second embodiment of the zoom lens is shown in FIG. 8.

Figure 9:
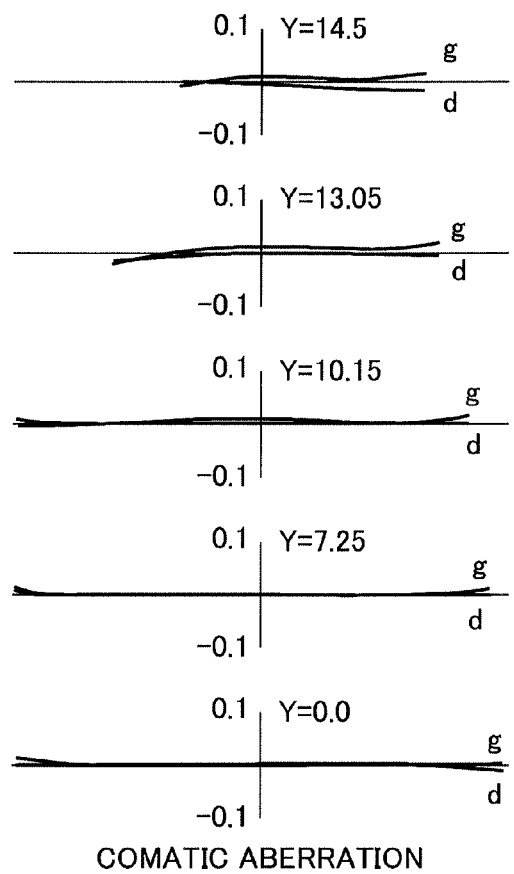
FIG. 9 depicts graphs of comatic aberration in the second embodiment of the zoom lens in infinity focus at the wide-angle end for zooming out.

Comatic aberration in the second embodiment of the zoom lens in infinity focus at the wide-angle end for zooming out is illustrated in graphs of FIG. 9.

Figure 10:
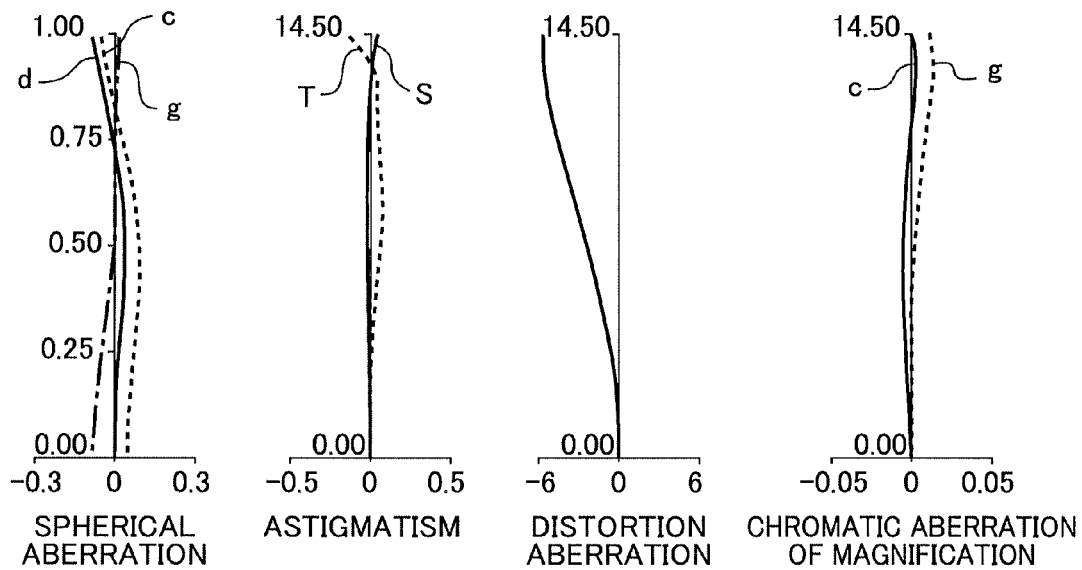
FIG. 10 depicts graphs of various types of aberration, such as spherical aberration, astigmatism, distortion aberration, and chromatic aberration of magnification, in the second embodiment of the zoom lens in infinity focus at the wide-angle end for zooming out.

Other various types of aberration, such as spherical aberration, astigmatism, distortion aberration, and chromatic aberration of magnification, in the second embodiment of the zoom lens in infinity focus at the wide-angle end for zooming out are illustrated in graphs of FIG. 10.

Figure 11:
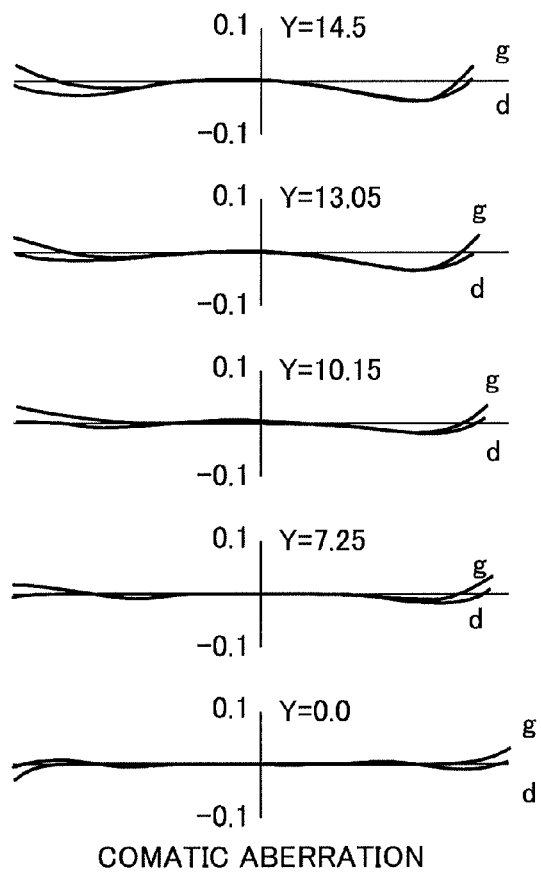
FIG. 11 depicts graphs of comatic aberration of the second embodiment of the zoom lens in infinity focus at the intermediate zooming range.

The comatic aberration of the second embodiment of the zoom lens in infinity focus at the intermediate zooming range is illustrated in graphs of FIG. 11.

Figure 12:
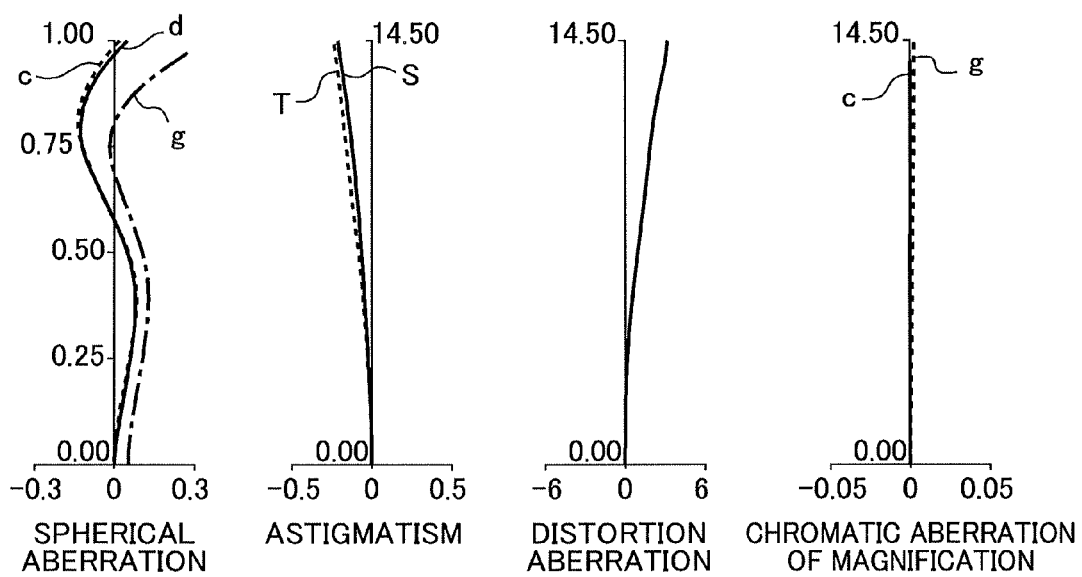
FIG. 12 depicts graphs of various types of aberration, such as spherical aberration, astigmatism, distortion aberration, and chromatic aberration of magnification, in the second embodiment of the zoom lens in infinity focus at the intermediate zooming range.

The remaining various types of aberration, such as spherical aberration, astigmatism, distortion aberration, and chromatic aberration of magnification, in the second embodiment of the zoom lens in infinity focus at the intermediate zooming range are illustrated in graphs of FIG. 12.

Figure 13:
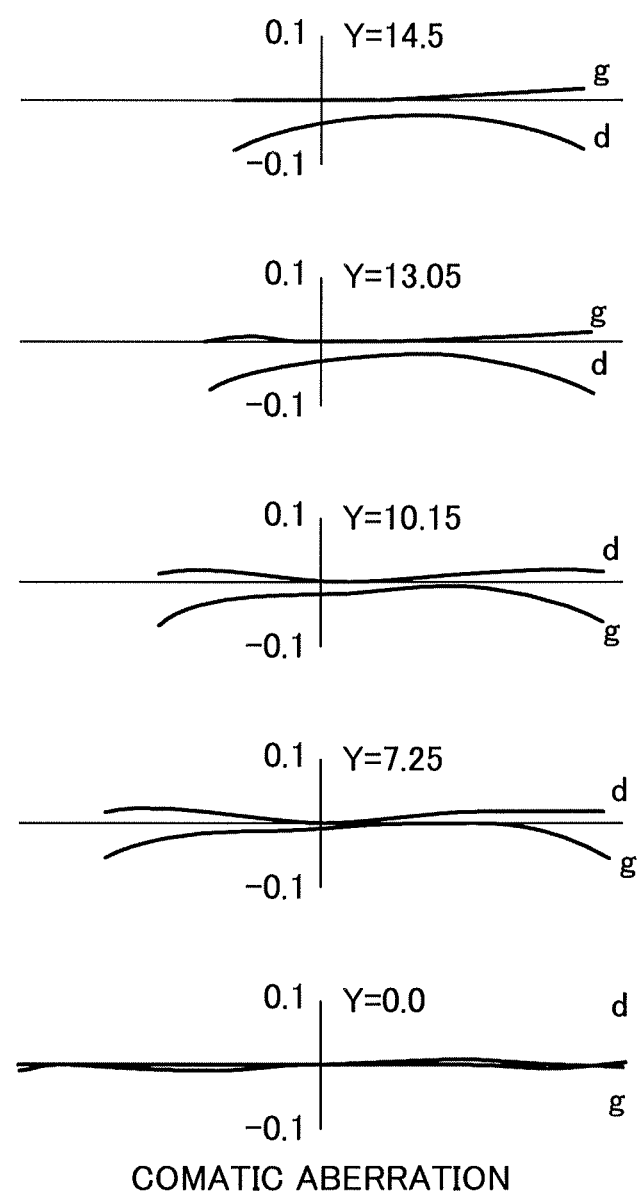

The comatic aberration of the second embodiment of the zoom lens in infinity focus at the telephoto end for zooming in is illustrated in graphs of FIG. 13.

Figure 14:
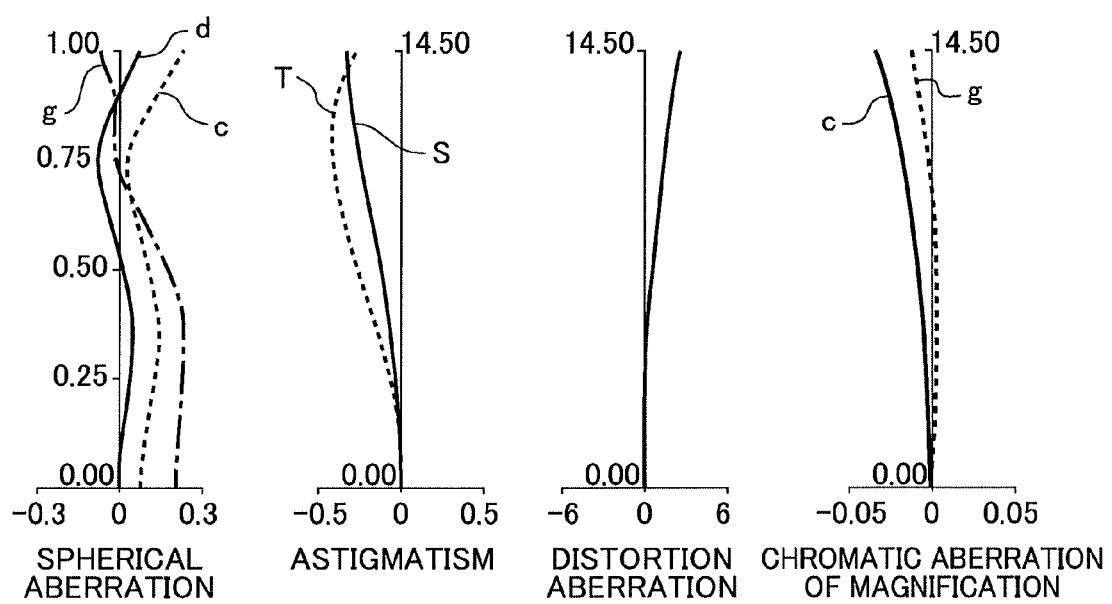

The remaining various types of aberration, such as spherical aberration, astigmatism, distortion aberration, and chromatic aberration of magnification, in the second embodiment of the zoom lens in infinity focus at the telephoto end for zooming in are illustrated in graphs of FIG. 14.

The invention claimed is:

1. A variable power zoom lens that has the foremost or first lens group of positive refractivity, the second lens group of negative refractivity, the third lens group of positive refractivity, and the fourth lens group of positive refractivity disposed in sequence from a position closer to an object to photograph toward an image plane;
   the third lens group having a front lens subset of positive refractivity and a back lens subset;
   the back lens subset alone being moved orthogonal to the optical axis to correct a blur of an image on the image plane caused by a shake of a photographer's hands; and
   the zoom lens being adapted to meet requirements as defined in conditional formulae (1) as follows:

$$12 < Lt/(Ft/Fw) < 15$$

where Lt is the entire length of the lens optics from the front surface of the foremost lens piece to the image plane at the telephoto end, Ft is a focal length of the lens optics in whole at the telephoto end, and Fw is the focal length of the lens optics in whole at the wide-angle end.

2. The variable power zoom lens according to claim 1, wherein the zoom lens meets requirements as defined in conditional formulae as follows:

$$-1.5 < F1/F\_Bt < -0.5$$

where F1 is a focal length of the first lens group, and F_Bt is the focal length from the front surface of the foremost lens piece in the second lens group to the image plane at the telephoto end.

3. The variable power zoom lens according to claim 1, wherein the zoom lens meets requirements as defined in conditional formulae as follows:

$$-3.5 < \beta t < -1.55$$

where βt is a lateral magnification of an anti-shake lens group at the telephoto end.

4. The variable power zoom lens according to claim 1, wherein the third lens group is comprised of a front lens subset of lens pieces of positive refractivity and a rear lens subset of lens pieces of negative refractivity, and the rear lens subset is used to correct the blur of the image.

5. The variable power zoom lens according to claim 1, wherein the fourth lens group is comprised of a series of lens pieces respectively having positive, negative, and positive refractive powers.

6. The variable power zoom lens according to claim 1, wherein the second lens group shows two deflection points throughout a single stroke of the second lens group during shifting from the wide-angle end to the telephoto end to vary magnification power.

7. The variable power zoom lens according to claim 1, wherein at least one of the lens groups shows two deflection points throughout a single stroke of the lens group during shifting from the wide-angle end to the telephoto end to vary magnification power.

8. A variable power zoom lens that has the foremost or first lens group of positive refractivity, the second lens group of negative refractivity, the third lens group of positive refractivity, and the fourth lens group of positive refractivity disposed in sequence from a position closer to the object to photograph toward the image plane, and
   the zoom lens meets requirements as defined in conditional formulae as follows:

$$-1.5 < F1/F\_Bt < -0.5$$

where F1 is a focal length of the first lens group, and F_Bt is the focal length from the front surface of τηε foremost lens piece in the second lens group to the image plane at the telephoto end.

9. A variable power zoom lens that has the foremost or first lens group of positive refractivity, the second lens group of negative refractivity, the third lens group of positive refractivity, and the fourth lens group of positive refractivity disposed in sequence from a position closer to the object to photograph toward the image plane, and
   the zoom lens meets requirements as defined in conditional formulae as follows:

$$-3.5 < \beta t < -1.55$$

where βt is a lateral magnification of an anti-shake lens group at the telephoto end.

* * * * *